US005191293A

United States Patent [19]

Kreckel

[11] Patent Number: 5,191,293

[45] Date of Patent: Mar. 2, 1993

[54] PARK AND RIDE METHOD FOR DETERMINING PHOTORECEPTOR POTENTIALS

[75] Inventor: Douglas A. Kreckel, Webster, N.Y.

[73] Assignee: Xerox Corporation, Stamford, Conn.

[21] Appl. No.: 752,793

[22] Filed: Aug. 30, 1991

[51] Int. Cl.[5] .......... G01N 27/60

[52] U.S. Cl. .......... 324/452; 324/457; 324/109; 355/203; 358/406

[58] Field of Search .......... 324/452, 457, 72, 109; 355/203; 358/406

[56] References Cited

U.S. PATENT DOCUMENTS 4,326,796 4/1982 Champion et al. .......... 324/457
4,355,885 10/1982 Nagashima .......... 324/457 X
4,433,297 2/1984 Buchheit .......... 324/457
4,433,298 2/1984 Palm .......... 324/457
5,040,021 8/1991 Fowlkes .......... 355/203

*Primary Examiner*—Jack B. Harvey
*Assistant Examiner*—Glenn W. Brown
*Attorney, Agent, or Firm*—Oliff & Berridge

[57] ABSTRACT

An electrostatic voltmeter adjacent to the surface of a photoreceptor belt or drum between, for example, the electrostatographic imaging station and developing station. A surface of the photoreceptor is charged at a charging station and the charged area is rotated and stopped adjacent to the electrostatic voltmeter. After a predetermined period of time, the surface potential of the charged area is measured by the voltmeter. Additional measurements can be made at subsequent times to determine a dark decay rate of the charged photoreceptor. Surface potentials at other areas adjacent the photoreceptor surface, such as in the development zone, can be determined based on the initial voltage applied to the photoreceptor surface at the charging station and the rate of dark decay. The invention allows for close monitoring/control of the surface potential at one or a plurality of development zones without the need for locating voltmeters within each development zone.

23 Claims, 2 Drawing Sheets

PARK AND RIDE METHOD FOR DETERMINING PHOTORECEPTOR POTENTIALS

BACKGROUND OF THE INVENTION

This invention relates to electrostatic printing machines and more particularly to an improved technique for determining the voltage level and dark decay rate on the photoreceptor in a printing machine.

Generally, in the process of electrostatographic printing, a photoconductive insulating member is charged to a substantially uniform potential to sensitize the surface thereof. The charged portion of the photoconducting insulating layer is thereafter exposed to a light image of an original document to be reproduced. This records an electrostatic latent image on the photoconductive member corresponding to the information areas contained within the original document. Alternatively, in a printing application, the electrostatic latent image may be created electronically by exposure of the charged photoconductive layer by an electronically controlled laser beam. After recording the electrostatic latent image on the photoconductive member, the latent image is developed by bringing a developer material charged of opposite polarity into contact therewith. In such processes, the developer material may comprise a mixture of carrier particles and toner particles or toner particles alone. Toner particles are attracted to the electrostatic latent image to form a toner powder image which is subsequently transferred to copy sheet and thereafter permanently affixed to copy sheet by fusing.

In reproduction machines using a drum type or an endless belt type photosensitive surface, the surface can contain more than one image at one time as it moves through various processing stations. The portions of the photosensitive surface containing the projected images, referred to as image areas, are usually separated by a portion of the photosensitive surface called the interdocument space. After charging of the photosensitive surface to a suitable charge level by a scorotron, the interdocument space area of the photosensitive surface is generally discharged by a suitable lamp to avoid attracting toner particles at the development stations.

Various portions of the photosensitive surface, therefore, will be charged to different voltage levels. For example, there will be the high voltage level of the initial charge on the photosensitive surface, a selectively discharged image area of the photosensitive surface, and a fully discharged portion of the photosensitive surface between the image areas.

In multi-color electrophotographic printing, in addition to forming a single latent image on the photoconductive surface, successive latent images corresponding to different colors are additionally recorded thereon. Each single color electrostatic latent image is developed with toner particles of a color complementary thereto. The process is repeated with a plurality of cycles for differently colored images and their respective complementarily colored toner particles. Each single colored toner image is transferred to the copy sheet in superimposed registration with the prior toner image. This creates a multi-layered toner image on the copy sheet. Thereafter, the multi-layered toner image is permanently affixed to the copy sheet creating a color copy. In transferring multiple toner images, each tone image must be in superimposed registration with one another in order to produce a color copy which is not blurred.

Copy sheet quality is dependent on careful control of photoreceptor surface potential. A useful tool for measuring voltage levels on the photosensitive surface is an electrostatic voltmeter or electrometer. The electrometer is generally rigidly secured to the reproduction machines adjacent the moving photosensitive surface and measures the voltage level of the photosensitive surface as it traverses the electrometer probe.

Exact voltage levels on the photosensitive surface, particularly at the developing zone, are necessary for good print quality. Two components of print quality, namely print contrast and background cleanness, are directly affected by the surface potential of the photosensitive surface at the developing zone. The surface voltage is a measure of the density of the charge on the photoreceptor, which is related to the quality of the print output. In order to achieve high quality printing, the surface potential on the photoreceptor at the developing zone should be within a precise range.

Locating a voltmeter directly in the developing zone is one way of measuring the surface potential at the developing zone. However, the accuracy of voltmeter measurements can be affected by the developing materials (such as toner particles) such that the accuracy of the measurement of the surface potential is decreased. In addition, in color printing there can be a plurality of developing areas within the developing zone corresponding to each color to be applied to a corresponding latent image. Because it is desirable to know the surface potential on the photoreceptor at each of the color developing areas in the developing zone, it would be necessary to locate a voltmeter at each color area within the developing zone. Cost and space limitations make such an arrangement undesirable.

An alternative method is to place a single electrometer outside the development zone and use it to monitor the surface potential of the photoreceptor. Such an approach requires a means for relating the voltage which is read by the remotely located electrometer to the voltage on the photoreceptor when it reaches the development zone. In general, there will be a difference, or error, between those two voltages; and that error will increase as the distance between electrometer and development zone increases. Furthermore, the error magnitude is expected to be different for each development zone in the system.

This invention describes a method for estimating that error without using another voltmeter, and, from time to time, revising the error estimate 'in situ' in the machine. This invention also may be applied for other purposes, such as diagnostic purposes, when the change in photoreceptor surface voltage with time is of interest.

U.S. Pat. No. 4,355,885 to Nagashima discloses an image forming apparatus having a surface potential controlled device wherein a magnitude of a measured value of the surface potential measuring means and an aimed potential value are differentiated. The surface potential control device may repeat the measuring, differentiating, adding and subtracting operations, and can control the surface potential within a predetermined range for a definite number of times.

U.S. Pat. No. 4,433,298 to Palm discloses a calibrated apparent surface voltage (ASV) apparatus which provides measurements of the ASV on a photoconductive imaging medium by using an ASV probe. A method of measuring an ASV on the photoconductor comprises the steps of a) providing a probe which is responsive to the ASV on an imaging member, b) exposing the probe to both a reference potential and to the ASV of the photoconductor surface so as to obtain a differential probe voltage output during a measurement interval, and c) recalibrating the probe sensitivity during a calibration interval.

U.S. Pat. No., 4,433,297 to Buchheit, assigned to Xerox Corporation, discloses an electrometer probe located adjacent a photosensitive surface. The electrometer head provides an input amplifier which functions as a comparitor to compare a voltage level on the photosensitive surface with a variable high voltage DC power supply. A measuring technique is used to provide a reliable voltage level signal by using a timed average amplitude comparison technique.

While the above-mentioned devices provide for measuring surface voltages, there continues to be a need for an apparatus and method for accurately determining surface potentials, particularly for a plurality of locations on the photoreceptor surface (such as for use in color copying).

SUMMARY OF THE INVENTION

It is an object of the present invention to provide an apparatus and method for accurately determining the surface potential of an electrostatic image recording device.

It is another object of the present invention to provide an apparatus and method for measuring the dark decay of a photoreceptor in situ in a xerographic copier or printer using a single electrostatic voltmeter.

It is still another object of the present invention to determine the surface potential on a photoreceptor at least one development zone along the photoreceptor surface by measuring the surface potential at a location other than at the at least one development zone, determining the dark decay rate of the photoreceptor surface, and extrapolating to determine the potential at the development zone.

It is yet another object of the present invention to provide a method and apparatus for performing calibrations of xerographic control systems in which photoreceptor characterization is required, and for performing diagnostic functions related to the photoreceptor or imaging system performance.

Still another object of the present invention is to provide an apparatus and method for determining the photoreceptor surface potential at each of four color development areas within the development zone based on a determined surface potential at a point other than within the development zone, and the dark decay rate of the photoreceptor surface.

These and other objects of the present invention are provided by a "park and ride" method for determination of photoreceptor potentials. In particular, a portion of the surface of the photoreceptor is charged, the photoreceptor is rotated and the charged area of the photoreceptor is stopped adjacent to a charge measuring device. The charge measuring device measures a voltage on the charged photoreceptor surface at a first time and at a subsequent second time, and uses the measured voltages to determine the rate of dark decay. This calibration enables an accurate extrapolation of surface voltages at the development zone(s), based on the voltages measured at the electrostatic voltmeter which is located away from the development area(s), so that the development potentials may be controlled accurately in the normal operating mode, with the photoreceptor in continuous revolution.

The normal time needed for the charged surface to rotate to the development zone(s) during a standard rotation of the photoreceptor can be determined from the speed of rotation of the photoreceptor. Based on this estimated time of rotation to the development zone and the rate of dark decay, the surface potential within the development zone is determined without the need for locating a voltmeter within the development zone. A plurality of surface potentials can be determined corresponding to a plurality of development areas, such as within a color copier, based on a plurality of times needed for rotation of the photoreceptor to each of the development areas, and on the rate of dark decay. Accuracy of the estimated voltage can be improved by repeating the park and ride operation some number of times and averaging the results. Alternatively, the accuracy may be improved by estimating the dark decay rate at more than one charging voltage, by, for instance, charging the surface of the photoreceptor to a high voltage and a low voltage and determining the rate of dark decay at each of the voltages.

BRIEF DESCRIPTION OF THE DRAWINGS

A more complete understanding of the present invention, as well as other objects and further features thereof, can be obtained by reference to the following detailed description taken with the following figures wherein.

DETAILED DESCRIPTION OF THE PREFERRED EMBODIMENTS

Figure 1:
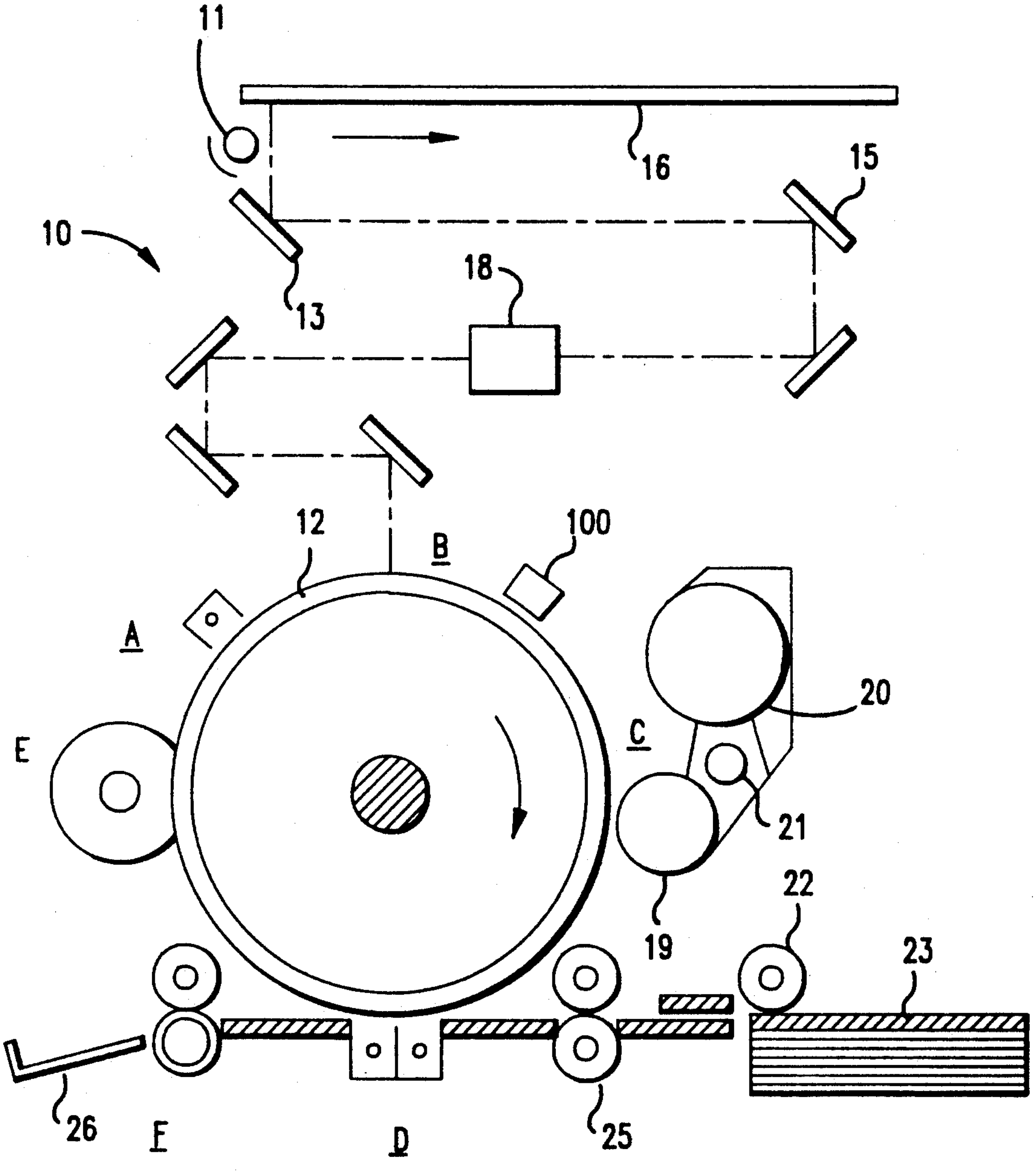
FIG. 1 is a schematic representation of an automatic printing machine which can utilize the surface potential measuring system of the present invention.

Referring now to FIG. 1, there is shown an automatic xerographic printing machine 10 including a developer assembly which has a removable developer storage and dispensing cartridge 20. As used herein, the term "developer" is intended to define all mixtures of toner and carrier as well as toner or carrier alone. The printer includes a photosensitive drum 12 which is rotated in the direction indicated by the arrow to pass sequentially through a series of xerographic processing stations; a charging station A, an imaging station B, a developer station C, a transfer station D and a cleaning station E.

A document to be reproduced is placed on imaging platen 16 and is scanned by a moving optical system including a lamp 11 and mirrors 13 and 15 and stationary lens 18 to produce a flowing light image on the drum surface which has been charged at a charging station A. The flowing light image on the drum surface at station B produces a latent image corresponding to the scanned document. The image is then developed at development station C to form a visible toner image. The development station C includes a developer roll 19 which may, for example, provide a magnetic brush of developer to the drum 12 which is supplied with developer from a developer hopper 20 by, for example, an auger 21. The top sheet 23 in a supply of cut sheets is fed by feed roll 22 to registration rolls 25 in synchronous relationship with the image on the drum surface, to the transfer station D. Following transfer of the toner image to the copy sheet, the copy sheet is stripped from the drum surface and directed to the fusing station F to fuse the toner image on the copy sheet after which the drum surface itself continues to cleaning station E where residual toner remaining on the drum surface is removed prior to the drum surface again being charged at charging station A. Upon leaving the fuser, the copy sheet with the fixed toner image thereon is transported to sheet collecting tray 26.

Voltage measuring device 100 is preferably a single electrostatic voltmeter. Because the voltmeter is not positioned at the development zone, there is greater room for mounting the voltmeter at the illustrated intermediate location. In addition, dirt, developer material, bias voltages or other hazards do not interfere with the electrostatic voltmeter performance.

Figure 2:
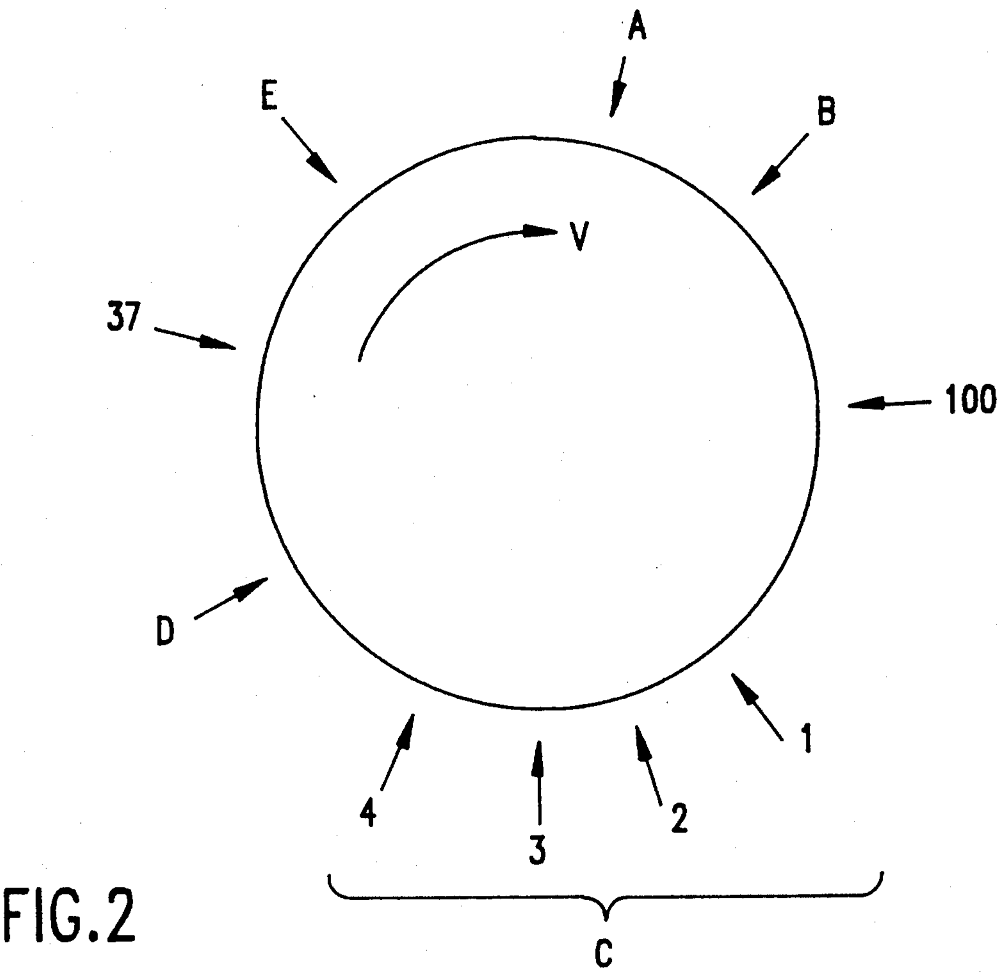
FIG. 2 is a schematic representation of a printing machine having a drum-type photoreceptor and a plurality of development areas such as in a color printer for the surface potential measurement and control of the present invention.
Figure 3:
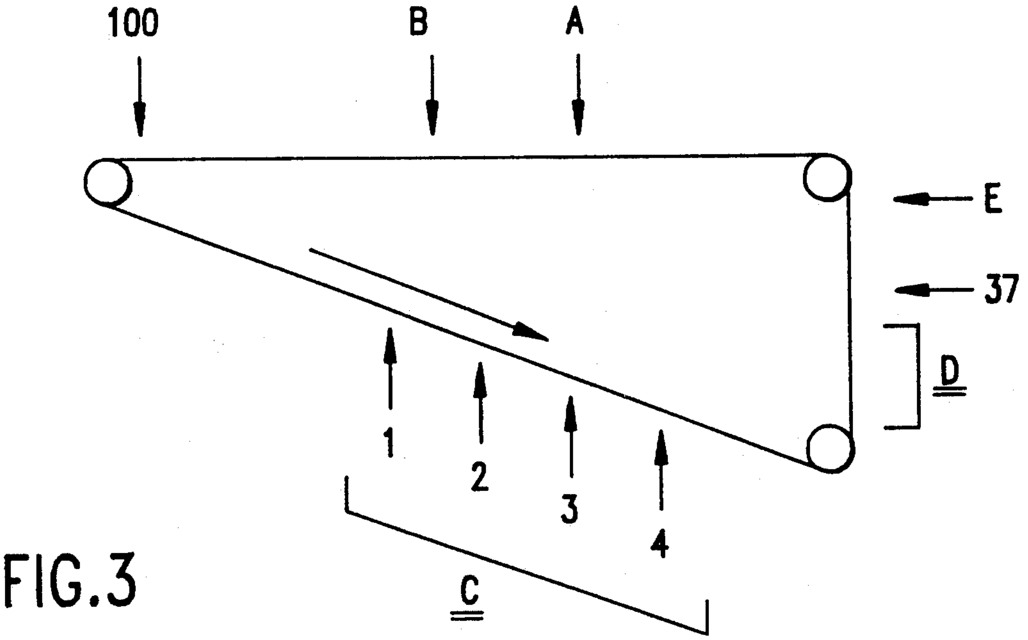
FIG. 3 is a schematic representation of a printing machine having a web-type photoreceptor and a plurality of development areas such as in a color printer for the surface potential measurement and control of the present invention.

In FIGS. 2 and 3, the voltage measuring device 100 is located between imaging station B and developer station C. In FIGS. 2 and 3, however, developer station C has developer areas 1-4 corresponding, for example, to four color developing areas within a color copier/printer. Also shown in these Figures are transfer station D, erasing station 37 and cleaning station E.

PARK AND RIDE

In one aspect of the present invention, the electrostatic voltmeter 100 measures the dark decay of the photoreceptor 12 in situ. The receptor surface is first charged at charging station A using a controlled charged voltage or current in the same manner as in standard latent image formation. The charged area of the photoreceptor surface is rotated until the charged area is adjacent the electrostatic voltmeter 100. The photoreceptor rotation is stopped ("parked"), and after a predetermined length of time, the electrostatic voltmeter measures the surface potential on the photoreceptor. Optionally, after a second predetermined length of time, the electrostatic voltmeter again samples the surface potential on the photoreceptor for determining the rate of dark decay of the charged surface ("riding" down the dark decay curve).

In addition, it is possible to a) measure the surface potential at two or more points in time (not necessarily related to two developer areas), b) fit the data to a mathematical model of the decay rate, e.g. by using a least-squares method, and c) use the model and fitted parameters as a basis for estimation of electrostatic parameters. It is thus possible to calculate a surface voltage given charge and exposure settings, or to estimate the charge and exposure settings given a selected surface voltage. This approach allows for the selection of charge and exposure operating points in a single or multiple developer system, and allows for modification of the set points to achieve desired results such as copy darkening/lightening.

The present invention can also be used to measure the dark decay rate of the photoreceptor, and use the rate to determine whether or not the photoreceptor dark decay rate meets system requirements. The measurement can be used, for example, to allow service personnel to determine whether or not to replace the photoreceptor. In addition, service personnel might determine whether or not stray or flare light levels are acceptable, or whether or not the light source is operating properly.

EXAMPLE 1

Park and Ride can be used to find the dark decay rate of a suitable photoreceptor, such as disclosed in U.S. Pat. Nos. 4,474,865; 4,559,287; and 4,983,481, the subject matter of these patents being incorporated herein by reference. The dark decay rate model and fitted parameters are then used to estimate the development potential (VDDP) at one or more developer locations. This can be done with a single electrostatic voltmeter preferably, but not necessarily, situated between the imaging zone and the development zone(s). The surface potential V of the photoreceptor decays in the dark such that its time dependence can be described by the expression $$V(t)=V^*+\beta t^d \quad [1]$$

where t is the time since charging. $V^*$ and $\beta$ are parameters which depend on the charging process and which, in general, vary with photoreceptor structure, materials and batch, and d is a parameter which depends on the type of photoreceptor used. Both $V^*$ and $\beta$ vary linearly with charge voltage when the charging device is a scorotron, so that the above expression can be expanded to $$V(t)=a_0+a_1{}^*V_{GRID}+(b_0+b_1{}^*V_{GRID})^*t^d \quad [2]$$

$V_{GRID}$ being the voltage applied to the scorotron grid. The Park and Ride method can be used two times in succession, using a separate value of $V_{GRID}$ each time, and making two voltage measurements each time to develop enough data to estimate the four parameters in equation [2]. For the first time, the photoreceptor is charged at a relatively high voltage, $V_{GRID}=C_H$, and a Park and Ride voltage measurement ($V_{H1}$) is made at the time ($t_1$) the charged area arrives at the ESV. Again at some later time ($t_2$), the voltage ($V_{H2}$) is remeasured. Then, the photoreceptor drive is restarted, and the remaining charge is erased by shining light on the photoreceptor. The process is repeated at a relatively low charging voltage ($C_L$) ($V_{L1}$ and $V_{L2}$ are measured at times $t_1$ and $t_2$ respectively). According to equation [2] (letting $\theta_1=f(t_1{}^d)$, and $\theta_2=f(t_2{}^d)$)

$$V_{H1}=a_0+a_1{}^*C_H+b_0{}^*\theta_1+b_1{}^*\theta_1{}^*C_H$$

$$V_{H2}=a_0+a_1{}^*C_H+b_0{}^*\theta_2+b_1{}^*\theta_2{}^*C_H \quad [3]$$

$$V_{L1}=a_0+a_1{}^*C_L+b_0{}^*\theta_1+b_1{}^*\theta_1{}^*C_L$$

$$V_{L2}=a_0+a_1{}^*C_L+b_0{}^*\theta_2+b_1{}^*\theta_2{}^*C_L$$

Equations [3] can be solved for the four parameters $a_0$, $a_1$, $b_0$, $b_1$, such that:

$$b_1=((V_{H1}-V_{H2})-(V_{L1}-V_{L2}))/(\Delta\theta^*\Delta C); \quad \Delta\theta=\theta_1-\theta_2, \; \Delta C=C_H-C_L$$

$$b_0=((V_{L1}-V_{L2})^*C_H-(V_{H1}-V_{H2})^*C_L)/(\Delta\theta^*\Delta C)$$

$$a_1=((V_{H2}-V_{L2})^*\theta_1-(V_{H1}-V_{L1})^*\theta_2)/\Delta\theta^*\Delta C)$$

$$a_0=((V_{H1}{}^*\theta_2-V_{H2}{}^*\theta_1)^*C_L-(V_{L1}{}^*\theta_2-V_{L2}{}^*\theta_1)^*C_H)/(\Delta\theta^*\Delta C)$$

Equation [2] can be arranged to $$V_{GRID}=(V(t)-a_0-b_0{}^*\theta/(a_1{}^*+b_1{}^*\theta) \quad [2]$$

so that the value of $V_{GRID}$ needed to obtain V(t) at time t can be estimated. Once $V_{GRID}$ is established, the parameters and equation [2] can be used to calculate the expected surface voltage at the ESV location, as well as the developers, to provide a check on the accuracy of the estimation procedure.

EXAMPLE 2

Park and Ride can be used to empirically determine the surface potential the photoreceptor would have had at some later point(s) in the process, in particular at a developer, had it not been stopped. Suppose one had a xerographic process architecture such as that shown in FIG. 2. With a charging device at A, imaging zone at B, an ESV at 100, four developer housings 1,2,3,4 arranged as shown, a transfer zone at D, erasure at 37 and cleaning at E. Suppose that there is sufficient variability between photoreceptors, charging devices, and/or machine environments that a single charge setting is not sufficiently accurate to maintain a target dark development potential (VDDP) at developers 1 to 4. The normal travel time from ESV 100 to the developers is calculated to be $t_1=d_1/v$ for developer 1, $t_2=d_2/v$ for developer 2, etc., where $v=r\omega$ ($\omega$ in radians/sec), $d_1=r\Theta_1$, $d_2=r\Theta_2$, $d_3=r\Theta_3$ and $d_4=r\Theta_4$ ($\Theta$ in radians).

The following procedure can be used to establish the proper settings for the charge device control system:

a) Select a normal charge setting for the charging device controller;

b) With the photoreceptor moving at surface velocity v, charge a representative section of the photoreceptor surface;

c) Continue the photoreceptor rotation until the center of the charged area is under ESV 100;

d) Stop the photoreceptor, read $V_{ESV}$ immediately ($V_{ESV}$ can be used as a set point equivalent during running for error checking purposes);

e) Wait for a period of time equal to t1, read the ESV, call the reading $V_1$;

f) Assume the target voltage at developer 1 is $V_{1,0}\pm e_1$

If $|V_1-V_{1,0}|<e_1$, use the present charge setting as the control point for developer 1, restart the photoreceptor drive, and proceed to set up the charge setting for the next developer, following steps a–f and using the appropriate times, target voltages and tolerances, until all charge settings have been determined.

Else

If $V_1<V_{1,0}$ increase the charge setting, otherwise decrease the charge setting, restart the photoreceptor drive, and repeat steps b through f.

Once charge settings have been determined, a similar procedure can be used to establish proper exposure levels for the illumination source, assuming that exposure is controllable. Instead of adjusting the charge setting, the charge setting is kept at its new set point for the appropriate developer and the exposure level is adjusted instead.

EXAMPLE 3

Charge an area of the photoreceptor ("patch") P1 to voltage $C_1$, and a second, adjacent patch P2 to $C_2$ at charge zone A. Assume that the voltages $C_1$ and $C_2$ correspond to $C_H$ and $C_L$ in the first example, though this is not a restriction. Charge a third patch P3, adjacent to P2, to the same voltage as P1. Measure the voltage V1 on patch P1 and V2 on patch P2 with the photoreceptor moving at its normal velocity. Halt the photoreceptor with patch P2 still beneath the ESV 100 and before patch P3 has reached the ESV. This will require an interval of time $t_1$ for the patches P1 and P2 to travel from the charge zone A to the ESV 100. Wait an increment of time Δt, restart the photoreceptor while measuring voltage V3 on P2, then measure the voltage V4 on patch P3 as it passes under the ESV at time interval $t_2$ after restarting the photoreceptor rotation. If $t_{D1}$ is the normal rotation time from charge to the developer at 1, then Δt is adjusted so that $$t_{D1}=(t_1+t_2+\Delta t)$$

Assuming the charge levels $C_1$ and $C_2$ correspond to $C_H$ and $C_L$ in the first example, then the voltages V1 and V4 correspond to $V_{1H}$ and $V_{2H}$, respectively, in example 1. Voltages V2 and V3 correspond to the voltages $V_{1L}$ and $V_{2L}$, respectively, in example 1. Time $t_1$ corresponds to $t_1$ in example 1 and time $t_{D1}$ corresponds to $t_2$ in example 1. Taking these correspondences into account, the analysis of the present data is identical to the analysis described in the first example.

EXAMPLE 4

An extension of Example 3 would be to use four patches, the first two corresponding to P1 and P2, above; the third patch P3 charged to $C_1$ and the fourth patch P4 charged to $C_2$, so that P3 and P4 are similar to P1 and P2. The photoreceptor is rotated and the voltages V1 and V2 of patches P1 and P2, respectively, are read as they pass beneath ESV 100 with the photoreceptor rotating. The photoreceptor rotation is halted before P3 arrives at the ESV, a period Δt is allowed to elapse, the photoreceptor is restarted and the voltages V3 and V4 on patches P3 and P4, respectively, are read as they pass beneath the ESV at time $t_2$ after restarting the photoreceptor. In this case the voltages V1 and V2 correspond to voltages $V_{1H}$ and $V_{1L}$, respectively, in Example 1, and voltages V3 and V4 correspond to the voltages $V_{2H}$ and $V_{2L}$, respectively, in Example 1. The times from charging the ESV reads are as in Example 3 so that the dark decay rate determination is as described above.

While the invention has been described with reference to particular preferred embodiments, the invention is not limited to the specific examples given, and other embodiments and modifications can be made by those skilled in the art without departing from the spirit and scope of the invention and the claims.

What is claimed is:

1. A method of measuring the voltage of the surface of an electrostatic image recording device within a copier or printer, comprising the steps of:

charging a portion of the surface of the recording device with a charging means to create a charged portion;

rotating the recording device;

stopping the rotation of the recording device when said charged portion is adjacent to a charge measuring means;

measuring a voltage, $v_1$, of said charged portion with said charge measuring means at a predetermined time.

2. The method of claim 1, wherein said charge measuring means is located between said charging means and at least one developer means.

3. The method of claim 1, wherein the charge measuring means is an electrostatic voltmeter.

4. The method of claim 1, further comprising the steps of:

waiting a predetermined period of time, and then measuring a second voltage $V_2$ after measuring said voltage $V_1$;

comparing said voltages $V_1$ and $V_2$ to determine the rate of voltage change on the surface of the recording device to arrive at a rate of dark decay of the recording device.

5. The method of claim 4, further comprising the steps of:

measuring additional voltages $V_3$, $V_4$, $V_i$, and fitting the voltages to an analytical function in order to estimate the decay rate of the surface potential.

6. The method of claim 5, wherein said analytical function is a least-squares regression.

7. The method of claim 4, further comprising the step of:

transmitting a signal from said charge measuring means when the difference between said first and second voltages exceeds a predetermined value.

8. The method of claim 4, further comprising the steps of:

transmitting a signal from said charge measuring means when the difference between said first and second voltages fails to exceed a predetermined value.

9. The method of claim 1, further comprising the steps of:

estimating the time needed for said portion of the surface of the recording device to rotate from an area adjacent to said charge measuring means to at least one developer means, based upon the standard speed of rotation of the recording device; and after said step of stopping the rotation of the recording device, waiting for a period of time equal to said estimated time before measuring said voltage, $V_1$, in said voltage measuring step.

10. The method of claim 9, wherein a plurality of developer means are located along the circumference of said recording device, said time estimating step comprises estimating a plurality of times, each of said estimated times being an estimate of the time needed for said portion of the photoreceptor to rotate the area adjacent to said charge measuring means to each of said plurality of developer means, based upon the standard speed of rotation of the photoreceptor; and said voltage measuring step comprising measuring a plurality of voltages at delay times equal to said estimated plurality of times.

11. A method of measuring the voltage of the surface of an electrostatic image recording device comprising the steps of:

charging a portion of the surface of the electrostatic image recording device by applying a voltage $c_H$ to a grid of scorotron to create a charged portion;

rotating the recording device;

stopping the rotation of the recording device when said charged portion is adjacent to an electrostatic voltmeter;

measuring a first voltage $V_{H1}$ of the surface after a time $t_1$, with said electrostatic voltmeter;

measuring a second voltage $V_{H2}$ of the surface after a time $t_2$ with said electrostatic voltmeter;

restarting the recording device rotation, while erasing said charge from the surface;

recharging the changed portion by applying a voltage $C_L$ different from said voltage $C_H$;

stopping the rotation of the recording device when said charged portion is adjacent to an electrostatic voltmeter;

measuring a third voltage $V_{L1}$ of the surface after a time $t_3$ with said electrostatic voltmeter;

measuring a fourth voltage $V_{L2}$ of the surface after a time $t_4$ with said electrostatic voltmeter; and determining the dark decay rate of said recording device surface from said values $C_H$, $C_L$, $V_{H1}$, $V_{H2}$, $V_{L1}$, $V_{L2}$, $t_1$, $t_2$, $t_3$, and $t_4$.

12. The method of claim 11, wherein said time delay is equal to the time necessary for the photoreceptor to rotate the charged portion of the photoreceptor from the scorotron to a developer means located adjacent the circumference of the photoreceptor, during standard printing/copying.

13. The method of claim 11, wherein after said charging step, partially or completely discharging the photoreceptor surface with an exposure device.

14. A method of measuring a voltage of the surface of a photoreceptor comprising the steps of:

a) determining a target voltage $V_T$, with an allowable error of $e_1$, for the surface of the photoreceptor at at time $t_i$;

b) charging a portion of the surface of the photoreceptor with a charging means by applying a set voltage C of said charging means to a grid of a scorotron to create a charged portion;

c) rotating the photoreceptor;

d) stopping the rotation of the photoreceptor when said charged portion is adjacent a charge measuring means, the time required to rotate from said charging means to said charge measuring means being $t_{rotation}$;

e) waiting a time period $t_1$, such that the combined time is equivalent to the time required to rotate the charged portion from the charging means to a selected development zone, and measuring a voltage $V_1$ with said charge measuring means;

f) comparing the voltage $V_T$ with the measured voltage $V_1$ to determine if $|V_1-V_T|\leqq e_1$;

g) maintaining the set voltage of said charging means at voltage C to obtain surface voltage $V_T$ if $|V_1-V_T|\leqq e_1$;

h) if $|V_1-V_T|>e_1$, setting said charging means to an increased voltage C if $V_1<V_T$, and setting said charging means to a decreased voltage of C if $V_1\geqq V_T$; and i) repeating steps a through h until $|V_1-V_T|\geqq e_1$.

15. The method of claim 14, wherein a plurality of charge settings are determined corresponding to a plurality of development zones.

16. A method of measuring a voltage of a surface of an electrostatic image recording device, comprising the steps of:

charging an area P1 of said surface to a first voltage C1;

charging an area P2, adjacent area P1, to a second voltage C2;

charging an area P3, adjacent area P2, to said first voltage c1;

charging an area P4, adjacent area P3, to said second voltage c2;

moving said surface such that said charged areas are moved to a position adjacent a charge measuring means;

measuring voltages V1 and V2 of respective areas P1 and P2 at a time $t_1$ after charging areas P1 and P2;

stopping the movement of said surface;

waiting for a period of time $\Delta t$;

restarting the movement of said surface;

measuring voltages V3 and V4 of respective areas P3 and P4 at a time $t_2$ after restarting the movement of said surface.

17. The method of claim 16, wherein a time $t_{D1}$ is a time required for a charged portion of said surface to move from a charging area to a developing area during normal operation of said electrostatic image recording device in an electrostatic printing machine, and wherein $t_{D1}=t_1+\Delta t+t_2$.

18. The method of claim 16, wherein a dark decay rate of the surface of said recording device is determined based on $C_1$, $C_2$, $V_1$, $V_2$, $V_3$, $V_4$, $t_1$, $\Delta t$, and $t_2$.

19. The method of claim 18, further comprising the steps of:

determining a plurality of times $t_{D1}$, $t_{D2}$, $t_{D3}$, $t_{D4}$ corresponding to times required for a charged portion of said surface to move from a charging area to a plurality of developing areas during normal operation of said electrostatic image recording device in an electrostatic printing machine;

determining desired voltages of said surface at said plurality of developing areas; and charging said surface at said charging area to achieve said determined desired voltages based at least in part on said determined dark decay rate.

20. A method of measuring a voltage of a surface of an electrostatic image recording device, comprising the steps of:

charging an area P1 of said surface to a first voltage C1;

charging an area P2, adjacent area P1, to a second voltage C2;

charging an area P3, adjacent area P2, to said first voltage C1;

moving said surface such that said charged areas are moved to a position adjacent a charge measuring means;

measuring voltages $V_1$ and $V_2$ of respective areas P1 and P2 at a time $t_1$ after charging areas P1 and P2;

stopping the movement of said surface;

waiting for a period of time $\Delta t$;

measuring voltage V3 of said area P2;

restarting the movement of said surface;

measuring voltage V4 of said area P3 at a time $t_2$ after restarting the movement of said surface.

21. The method of claim 20, wherein a time $t_{D1}$ is a time required for a charged portion of said surface to move from a charging area to a developing area during normal operation of said electrostatic image recording device in an electrostatic printing machine, and wherein $t_{D1}=t_1+\Delta t+t_2$.

22. The method of claim 20, wherein a dark decay rate of the surface of said recording device is determined based on $C_1$, $C_2$, $V_1$, $V_2$, $V_3$, $V_4$, $t_1$, $\Delta t$, and $t_2$.

23. The method of claim 22, further comprising the steps of:

determining a plurality of times $t_{D1}$, $t_{D2}$, $t_{D3}$, $t_{D4}$ corresponding to times required for a charged portion of said surface to move from a charging area to a plurality of developing areas during normal operation of said electrostatic image recording device in an electrostatic printing machine;

determining desired voltages of said surface at said plurality of developing areas; and charging said surface at said charging area to achieve said determined desired voltages based at least in part on said determined dark decay rate.

* * * * *